United States Patent [19]
Krantz et al.

[11] Patent Number: 5,212,572
[45] Date of Patent: May 18, 1993

[54] OPTICAL DATA STORAGE SYSTEM WITH COMPACT HOLOGRAPHIC POLARIZATION-SENSING OR REFLECTIVITY-SENSING OPTICAL STORAGE HEAD

[75] Inventors: Matthias C. Krantz, San Jose; LeRoy D. Dickson, Morgan Hill, both of Calif.

[73] Assignee: International Business Machines Corporation, Armonk, N.Y.

[21] Appl. No.: 796,159

[22] Filed: Nov. 22, 1991

[51] Int. Cl.$^5$ ............................................... G02B 5/32
[52] U.S. Cl. ........................................ 359/15; 359/18; 359/485; 369/44.41; 369/103; 369/110; 250/201.5; 257/80
[58] Field of Search ........................ 359/15, 17, 18, 19, 359/16, 485; 369/103, 110, 44.41; 250/201.5; 357/19

[56] References Cited

U.S. PATENT DOCUMENTS

| | | | |
|---|---|---|---|
| 4,736,231 | 4/1988 | Ayabe et al. | 357/19 |
| 4,905,216 | 2/1990 | Lee | 359/19 |
| 5,032,879 | 7/1991 | Buchmann et al. | 357/19 |

FOREIGN PATENT DOCUMENTS 1-13246 1/1989 Japan.
63-25845 2/1989 Japan.
1-55745 3/1989 Japan.

OTHER PUBLICATIONS

Kogelnik, "Coupled Wave Theory for Thick Hologram Grating" *Bell Technical Journal*, Nov. 1969, vol. 48, #9, pp. 2909-2945.

Primary Examiner—Bruce Y. Arnold
Assistant Examiner—J. P. Ryan
Attorney, Agent, or Firm—Henry E. Otto, Jr.

[57] ABSTRACT

An optical data storage system having a highly integrated optical storage head that (1) integrates the read, write and servo paths, (2) comprises a monolithic laser-detector storage array that is integrated on a single chip an, wherein laser-detector alignment desirably is fixed at the time of fabrication, and (3) comprises a four-hologram optical element that directs light to an optical disk and divides the returning light into one track error and two focus error servo beams and two polarization component beams for data detection, and also provides a satellite beam of the incident laser beam for monitoring power of the laser beam.

16 Claims, 6 Drawing Sheets

OPTICAL DATA STORAGE SYSTEM WITH COMPACT HOLOGRAPHIC POLARIZATION-SENSING OR REFLECTIVITY-SENSING OPTICAL STORAGE HEAD

FIELD OF THE INVENTION

This invention relates to optical data storage systems and more particularly to one including a compact optically and electronically integrated holographic polarization-sensing or reflectivity-sensing optical storage head.

BACKGROUND OF THE INVENTION

To reduce the size and cost of optical storage heads without sacrificing efficiency, considerable attention is being directed to optical and electronic integration. Optical integration seeks to reduce the number of components used for beam steering, polarization discrimination, circularization of the laser beam, and data and servo signal generation, and to eliminate or reduce precision alignment requirements for the individual components. Electronic integration aims to combine all opto-electronic components on a single module or chip.

U.S. Pat. No. 4,907,847 and various Japanese published unexamined patent applications describe prior attempts, employing low efficiency surface relief holograms, to reduce the number of components and hence overall cost of an optical storage system. For example, see JP1-13246, published Jan. 18, 1989; JP1-55745, published Mar. 2, 1989; and JP 63-25845, published Feb. 3, 1988.

All of the above patents describe optical storage heads incapable of magneto-optic recording except JP1-13246 which uses difficult to manufacture varying pitch gratings.

In surface relief holograms the holographic beam interference pattern may be recorded by a photolithographic process or using a mold and results in a periodic variation in the thickness of the holographic material without change of its refractive index. By contrast, in volume holograms, the interference pattern is recorded as a periodic variation in the refractive index of a holographic material whose thickness remains fixed. While processing volume holograms is usually more involved, they direct light much more efficiently than surface relief holograms. The angle of incidence at which maximum diffraction efficiency occurs is known as the Bragg angle.

Surface relief holograms are unable to achieve efficient polarization separation except for a limited range of diffraction angles. By contrast, volume holograms can be designed to achieve efficient beam separation for small angular changes and can achieve polarization separation over a wide range of angles, such as is taught in U.S. Pat. No. 4,497,534 issued Feb. 5, 1985. Polarization separation is especially important in a magneto-optical system wherein data is sensed as changes in the plane of polarization of the light reflected from the optical storage medium.

Commonly assigned copending application U.S. Ser. No. 07/774,410, for "Hologram System" filed Oct. 10, 1991 (Docket SA990033) (now abandoned) discloses a hologram system that employs a sandwich of two or four holograms to permit the small beam angle separations that are preferred in optical storage systems so that optical sensors may be located close to each other. However, this hologram sandwich generates only three beams (two data beams and one servo beam) and needs additional optical elements as a result of a lower degree of optical integration. Because only one servo beam is generated, the servo detector in this system requires many elements. Also, the laser and detector; are not integrated into a single monolithic array, and so the detectors require precision post-assembly alignment with the laser.

While the optical storage systems described above have to some degree reduced the complexity and number of components of an optical head, they do not achieve integration of the write path. Complete integration of the read, write and servo paths is essential for opto-electronic integration of all laser and detector devices on a single chip. To integrate on a single chip the laser, data and servo beams must have small angular separations and lie in a single plane to permit focusing on the PN-junction plane of the chip. The write path must maintain a single beam spot on the disk, yet allow multiple beams to be generated upon return and also compensate for dispersion effects associated with holograms and laser wavelength shifts. Also, polarization discrimination is necessary to allow the differential detection required for current state of the art magneto-optical recording media.

There is a need for an optical data storage system having a higher degree of both optical and electronic integration of an optical or magneto-optical storage head than is suggested by the prior art known to applicants.

SUMMARY OF THE INVENTION

Toward this end, and according to the invention, there is provided an optical data storage system having a highly integrated optical storage head that (1) integrates the read, write and servo paths, (2) comprises a monolithic laser-detector array that is integrated on a single chip and wherein laser-detector alignment desirably is fixed at the time of fabrication, and (3) comprises a four-hologram optical element that directs light to an optical disk and divides the returning light into one track error and two focus error servo beams and two polarization component beams for data detection, and also provides a satellite beam of the incident laser beam for monitoring power of the laser beam.

DESCRIPTION OF PREFERRED EMBODIMENT

Figure 1:
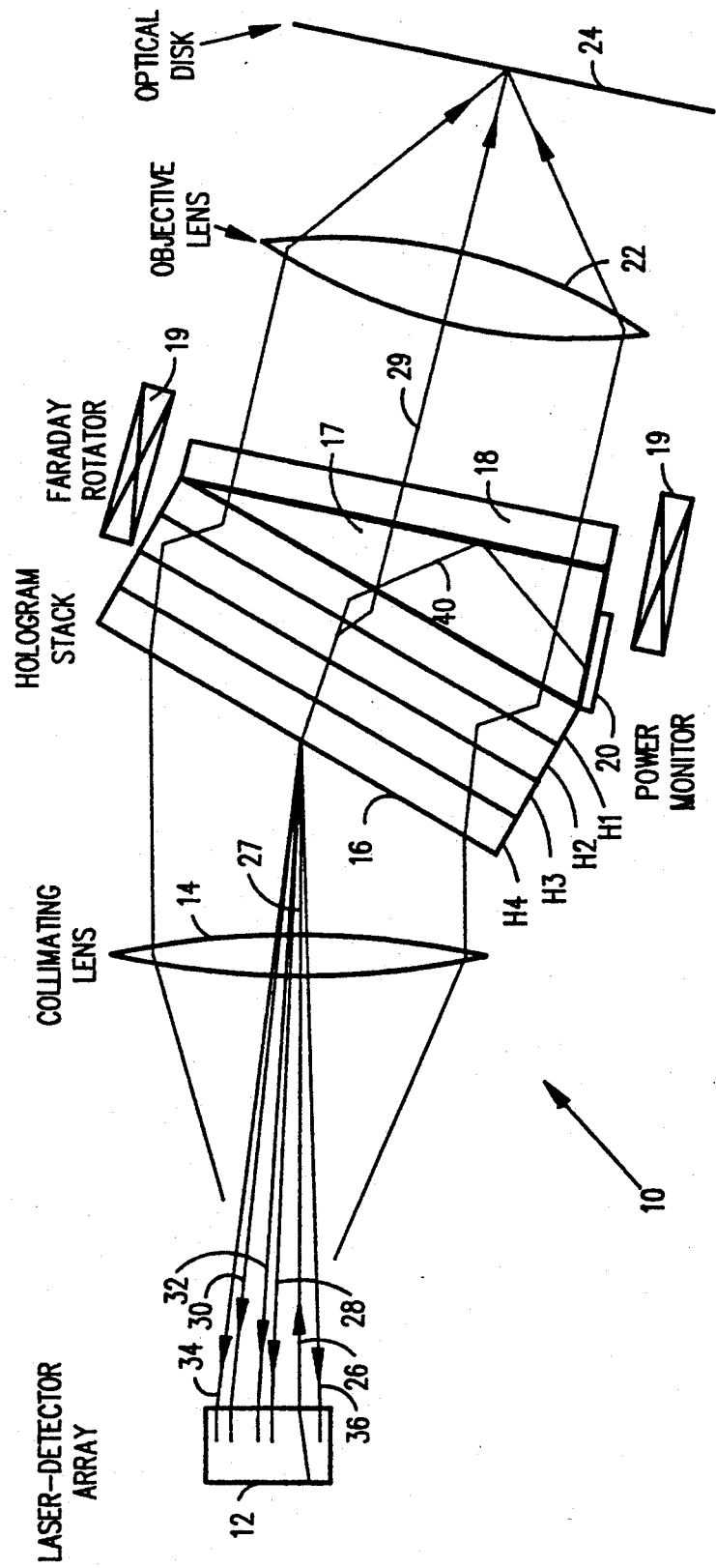
FIG. 1 is a schematic diagram depicting a compact holographic magneto-optical head illustrating one embodiment of the invention, the various collimated or converging beams being indicated only by their respective direction of propagation.

As illustrated in FIG. 1, an optical data storage head 10 embodying the invention comprises a monolithic laser-detector array 12, a collimating lens 14, a four-hologram optical element sandwich-like stack 16, a prism 17, and a Faraday rotator 18 having magnets 19. The configuration just described constitutes a closely centered retro-reflective autocollimated optical data storage head, whose elements are shown associated with a laser power monitor 20, an objective lens 22, and an optical recording disk 24.

Laser-detector array 12 preferably comprises, on one compound semiconductor chip, such as an AlGaAs chip, a diode laser and six detectors achieved by forward and reverse biasing adjacent p-n junctions. The laser generates a coherent light beam 26 having a wavelength of approximately 780 nanometers. Collimating lens 14 collimates beam 26 into a beam 27 and focuses the returning signal beams (hereinafter described) onto the detectors of array 12. Attached to the array/collimating lens package 12,14 is the four-hologram optical element stack 16, prism 17 and Bi-substituted Fe garnet film Faraday rotator 18.

The four polarization-sensitive and angle-sensitive volume phase transmission holograms of stack 16 have no optical focusing power. They and Faraday rotator 18 generate from collimated beam 27, a single intense beam 29 that is focused by objective lens 22 onto optical disk 24 for writing and reading; and rotator 18 and stack 16 generate, in a return read path, two data beams 28,30 and three servo beams 32,34,36 with specifically selected pointing angles, intensity ratios and polarization properties.

The Faraday rotator 18 provides the optical anisotropy for separation of the laser, and various data and servo beams in the holograms by polarization discrimination. As a result of the hologram design, multiple intense beams for data and servo signals are generated only in the return path, thus allowing a single read and write spot on the disk. Also, rotator 18 maintains the linear polarization required on the optical disk 24 for MO detection and the rotation angle is chosen to closely balance the s and p polarized data signals for differential detection and common mode rejection.

Figure 2:
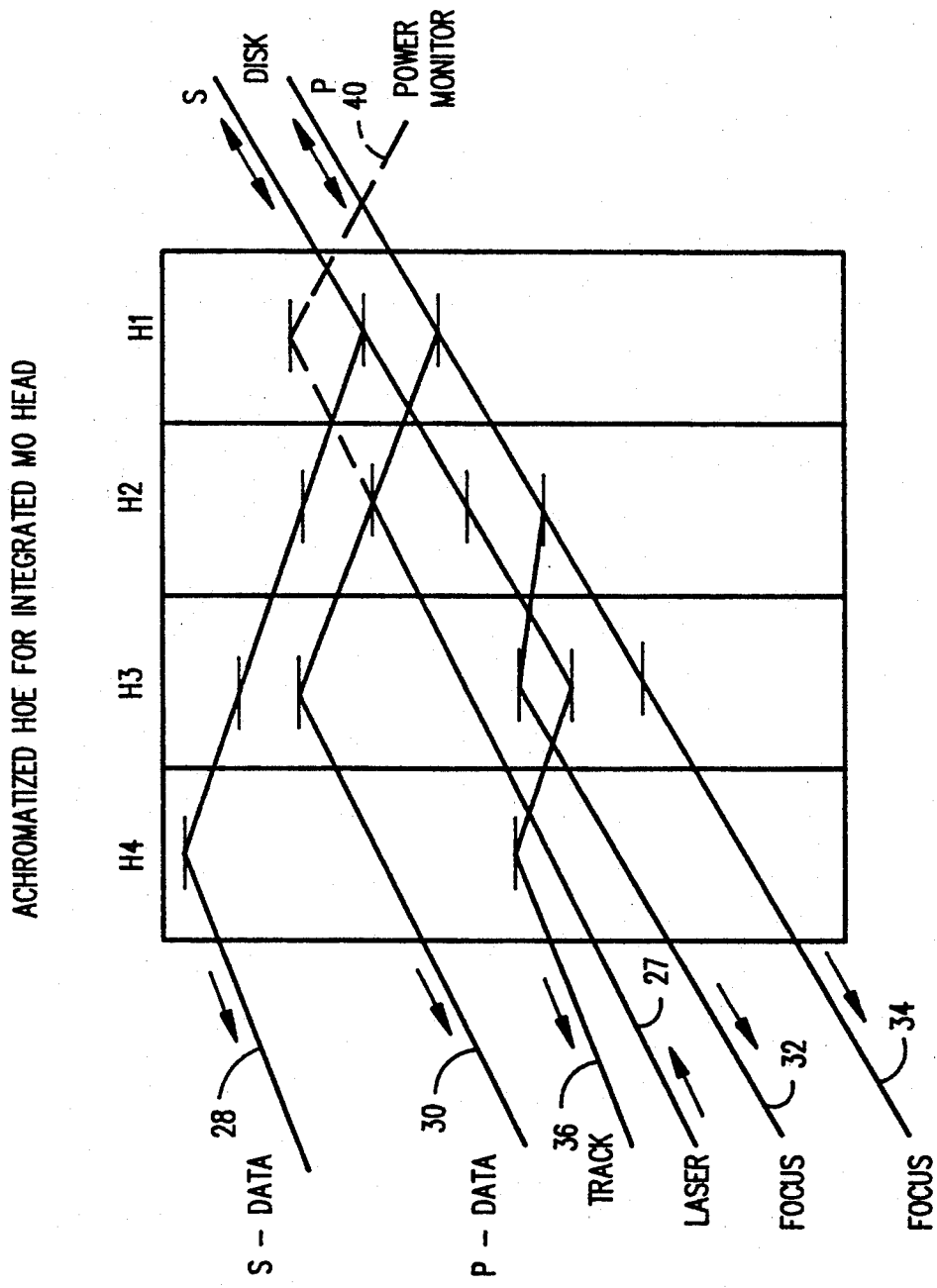
FIG. 2 is a diagram of a four-element volume phase transmission hologram, shown as part of the magneto-optic head of FIG. 1, schematically depicting the diffraction and generation of the various s and p polarized laser, data and servo beams in an achromatized configuration.

FIG. 2 schematically depicts details of the individual beam paths through the sandwich-like stack 16. In the write path, the laser light beam 27 emerges polarized in a direction (hereinafter denoted as "p-polarization") parallel to the p-n junction plane of the integrated laser detector array 12. Beam 27 traverses the first two holograms (H4 and H3) undiffracted due to their polarization and angular selectivity, respectively. At the last two holograms (H2 and H1) diffraction occurs in opposite directions with a small net angle and near respectively 50% and 90% efficiency generating only a single intense satellite beam 40 for monitoring the laser power. The linearly polarized laser light beam 27 is rotated by the Faraday rotator 18 and focused on the magneto-optical disk 24.

In the return (read) path, the Kerr rotated and reflected light from disk 24 is collimated by objective lens 22 and the linear polarization is rotated again by Faraday rotator 18.

Upon striking the respective holograms the following occurs: H1 splits the servo beams from the data beams. H2, with a diffraction efficiency near 50% for p polarized light and 0% for s polarized light, generates the p data beam and splits both focus servo beams with near equal intensity. H3 diffracts the p data beam while transmitting the laser beam and thus is the only hologram requiring high Bragg angle sensitivity. The s polarized data beam is transmitted unchanged while simultaneously the s polarized track servo beam is diffracted with 100% efficiency. To accomplish this the Bragg planes need a small slant angle to create asymmetric incidence angles for the beams incident from above and below the Bragg planes of the volume hologram. The same effect is utilized for both polarizations thus creating with the single holographic optical element stack 16 the correct diffraction efficiency for six polarized beams. H4 accomplishes achromatization and beam steering for the s polarized data and servo beams while transmitting all p polarized beams undiffracted.

As a result, nearly no light is lost in unwanted secondary diffraction. Also, optical power and segmentation of the holograms with the associated chromatic, wavefront distortion, and alignment problems is avoided. Each beam (except the one for the power monitor 20) is diffracted twice in opposite directions for cancelation of wavelength shift effects (achromatization).

The collimated s and p polarized data signal and servo beams emerge from the hologram stack 16 with the small angular separation required for electronic integration. The angular beam separations between the p polarized laser beam and focus servo beam 34 as well as between p-data beam 30 and focus servo beam 32 is given by the Bragg angle difference between H1 and H2.

Separation between the respective beam pairs is determined by the Bragg angle of H3. This parameter must also be chosen to provide a minimum angular separation between the p data beam and the laser beam according to the Bragg angle sensitivity of H3. The is polarized data and servo beams are separated by the Bragg angle sensitivity of H3. The s polarized data and servo beams are separated by the Bragg angle difference between H1 and H3 and their pointing direction is controlled by the, Bragg angle of H4. To minimize the thickness of H3 (i.e., the Bragg angle sensitivity requirement, and the overall angular separation for a small chip design), the laser and p data beams should be spaced apart as far as possible. The polarization properties and other design features can be used for interleaving the three groups of beams and minimizing the chip size. The emerging beams are focused on different detectors in the junction plane of the AlGaAs chip allowing for differential detection of the small Kerr rotation angle, common mode rejection of reflectivity noise and generation of servo signals.

It will now be seen that hologram stack 16 performs all beam splitting, beam steering, polarization discrimination, circularization and dispersion compensation functions required for MO data and servo signal generation.

The relevant theory for wave propagation in inhomogeneous dielectric media is described by H. Kogelnik, in "Coupled Wave Theory For Thick Hologram Gratings," published in Bell Syst. Tech. J. 48, 2909 (1969), and need not be reiterated here.

Based upon his classical theory, the following parameters are appropriate for the holograms H1-H4 of stack 16:

TABLE 1

|   |   | H1 | H2 | H3 | H4 |
|---|---|---|---|---|---|
| $\Theta$, | Bragg angle (internal) in degrees | 25.375 | 25.125 | 26 | 25.25 |
| $\alpha$, | slant angle of the grating in degrees | 0 | 0 | 1.275 | 0 |
| T, | thickness in microns | 2.5 | 16 | 31 | 7 |
| $n_o$, | refractive index | 1.26 | 1.26 | 1.26 | 1.26 |
| $\Delta n$, | modulation of refractive index | 0.175 | 0.089 | 0.092 | 0.152 |
| $\lambda$ | wavelength in air | 0.78 | 0.78 | 0.78 | 0.78 |

According to important features of the invention, it will be noted from the above tabulation that all of the holograms except H3 have zero slant angles. This is in order to avoid shrinkage tilt encountered during fabrication of dichromated gelatin holograms. H3 has a slant angle so small that variations in tilt and Bragg angle are negligible. Also, Bragg angles are near 25° provide optimum tuning for s and p diffraction efficiency and near optimum Bragg angle sensitivity in air. All beams, except the undiffracted servo beam, are diffracted twice by the holograms to compensate for dispersion. This desirably provides small net angle differences between the incident and returning beams, even though the Bragg angles for these individual beams are large. The pointing angle of each beam is controlled by its respective Bragg angle.

The data/servo intensity ratio is determined by the $\Delta n$ of hologram H1; whereas the p data/write path intensity ratio is determined by the $\Delta n$ of hologram H2. The overall s/p intensity ratio affecting data and servo intensities is controlled by the rotation angle of Faraday rotator 18 and is chosen to balance the s and p data beams for differential detection and common mode rejection.

Circularization of the collimated incident beam is achieved at the H4—air interface as a result of the incident beam not being normal to the hologram H4. Prism 17 prevents a reversal of this circularization effect upon exiting H1. High circularization ratios require large incident angles achievable with higher Bragg angles or a prism sandwiched to H4. For the above Bragg angles the circularization ratio is about 1.2. As a result of the retroreflective system, data and servo beam spots on the array are elliptical, similar to the laser beam. This is an advantage since it reduces the spacing requirement for the track servo.

Using the values in Table 1, Kogelnik's coupled wave theory yields the following transmitted intensities for the s and p polarized beams through the four element hologram stack 16:

| s Polarization: | Data 0.753 | Trackservo 0.08 | | |
|---|---|---|---|---|
| p Polarization: | Data 0.445 | Focusservo 0.05 | 0.05 | Laser 0.375 |

Thus the total efficiencies for all p and s polarized beams are 92% and 83%, respectively. The s and p data signals are balanced with a single pass Faraday rotation angle near 15 degrees.

The maximum angle difference between the emerging beams is 3.25°, which with a 7 mm collimating lens 14 permits all active elements to be integrated on a 750 micron wide chip. With a higher Bragg angle sensitivity or a shorter focal length collimating lens 14, the size of the optical head and the chip may be reduced further.

The optical system embodying the invention provides dispersion compensation which produces very high beam pointing stability despite laser wavelength shifts. Using a maximum anticipated diode laser wavelength fluctuation of 10 nm and the maximum Bragg angle differences herein disclosed yields a beam pointing stability of $\Delta\beta$0.0006 degrees. With a 7 mm focal length collimating lens 14, this corresponds to a beam displacement of less than 0.05 $\mu$m along the junction plane of laser detector array 12. Using the approximately 2 nm laser wavelength shift between read and write power levels with a 3.9 mm focal length objective results in spot shifts of less than 0.0009 $\mu$m on disk 24. The diffraction efficiencies of the individual beams in the four-element hologram stack 16 are not significantly affected by laser wavelength variations. Shifts of 10 nm result in efficiency variations between $\pm 2$ and $=12\%$ depending on the specific beam.

Figure 3:
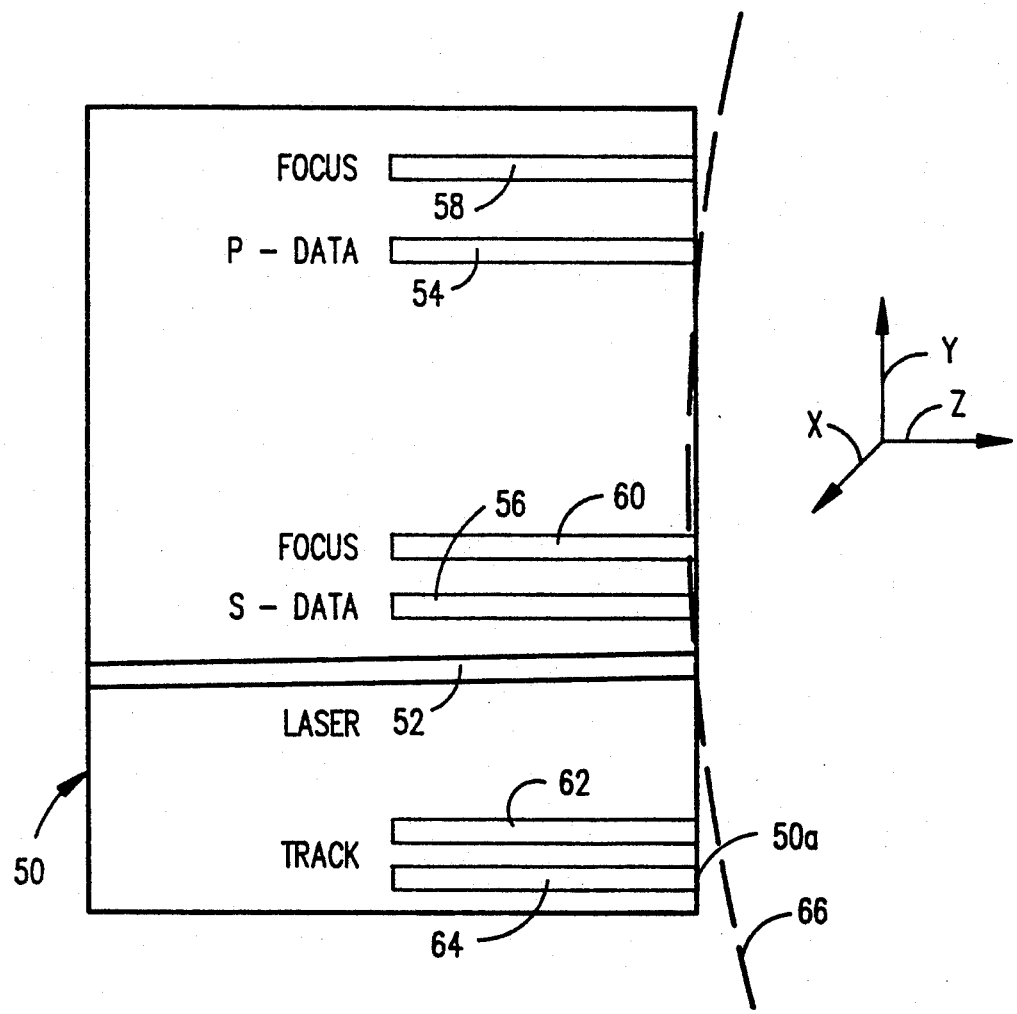
FIG. 3 is a schematic diagram depicting, in greater detail and to enlarged scale, the configuration of a monolithic integrated laser-detector array also shown in FIG. 1.

FIG. 3 shows a preferred embodiment of the integrated laser-detector array 12 together with a notation of its X, Y and Z directions. According to an important feature of the invention, array 12 is a planar array, lithographically fabricated on a single AlGaAs chip 50, and the laser and detector portions of the array are inherently and permanently focally aligned (in the Z direction) as part of the fabrication process, and spatially (in the Y direction), in the following manner. As illustrated, the array comprises a laser diode 52 having a forward-biased p-n junction and six diodes 54,56,58,60,62,64 having their p-n junctions reverse biased so as to act as light detectors. Diodes 54,56 are data detectors; diodes 58,60 are focus error servo detectors; and diodes 62,64 are track error servo detectors.

The distances between the detectors and the laser diode 52 are arranged according to the beams emerging from the holograms and the focal length at the collimating lens 14. With a collimating lens having a 7 mm focal length and the holograms of Table 1, center-to-center distances from laser diode 52 are 57 $\mu$m and 409 $\mu$m for the data detectors 56 and 54, 115 $\mu$m and 529 $\mu$m for the focus detectors 60 and 58, and 227 $\mu$m for the center between the closely spaced ($\leqq 2$ $\mu$m), track servo detectors 62 and 64. The detectors are approximately 10-15 $\mu$m wide and their placement on the chip may be arranged differently for different collimating lenses or slight variations in the focus and track servo schemes.

Collimating lens 14 provides a field curvature, indicated as a parabolic Petzval surface 66, originating at the laser facet 50a, to defocus the return signal beams (in the Z direction) as necessary to generate the servo signals. When using field curvature to generate defocused servo beams, the optical axis of the laser diode junction should be tilted approximately 0.3° from a direction normal to the facet 50a of chip 50. This is necessary to produce the tilted Petzval surface 66 with data detectors that are nearly focused and with the correct focus offset for the servo detectors of array 12. The locations of the respective detectors in the direction denoted as Y in FIG. 3 are to the laser diode 52 in conjunction with the 7 mm focal length collimating lens 14. Since these diodes 52-64 are closely spaced on chip 50, only the single collimating lens 14 is required. As a result, the light emerges and is incident at the facet regions. Lateral definition of the laser diode and detectors is provided electrically by separation trenches and optically by ridge waveguides. Thus the light incident on the detectors is mode-matched to the waveguides, thereby providing high coupling and detection efficiency.

Alternatively, instead of only using the Petzval surface approach, etched facets, as heretofore proposed, could be used to provide additional offsets in the focus and track servo beams and thereby permit a different placement of detectors on the chip.

Figure 4:
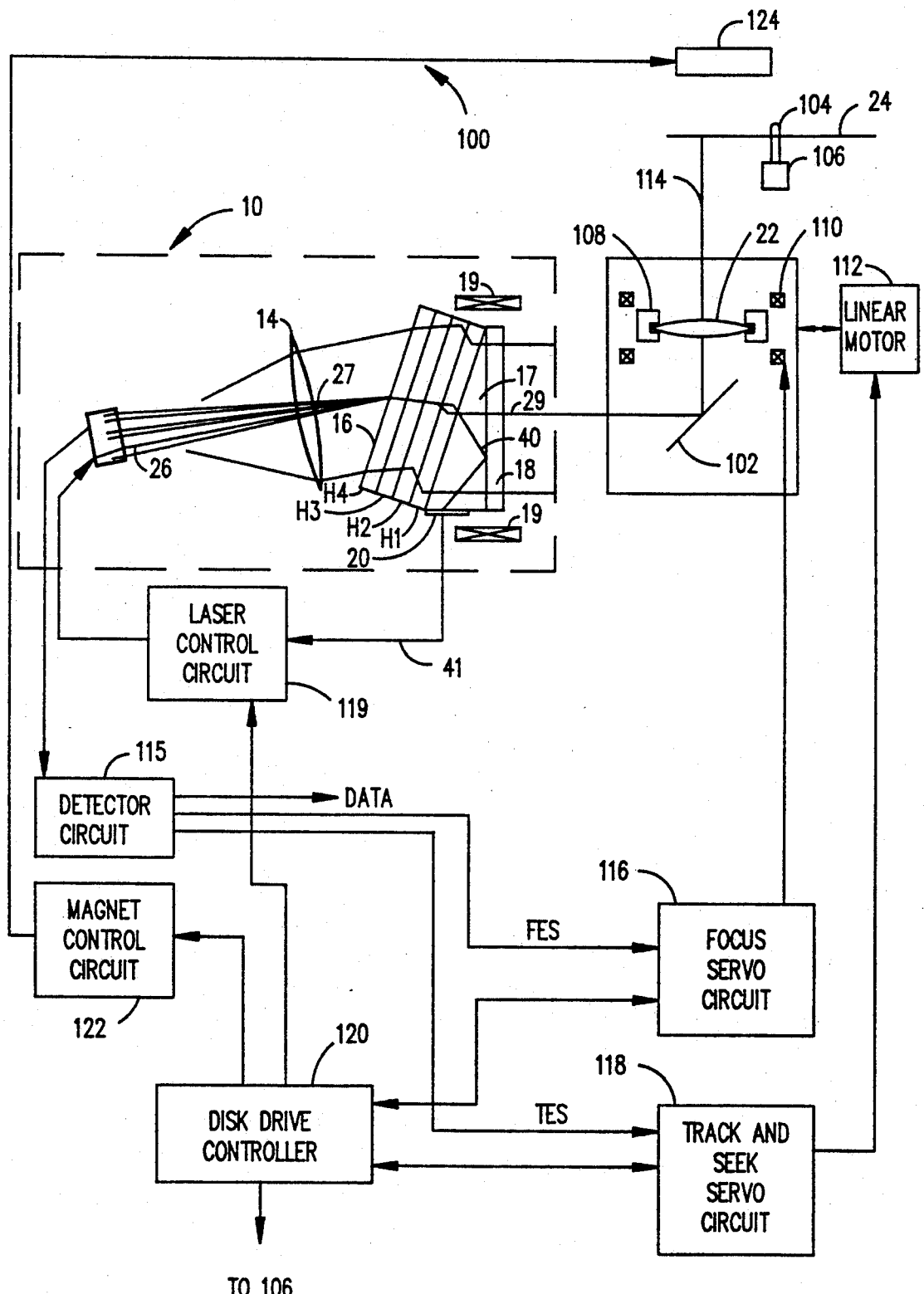
FIG. 4 is a diagrammatic view of a magneto-optical data storage system embodying the invention.

FIG. 4 illustrates how the compact optical head 10 may be integrated into a magneto-optical (MO) data storage system 100 embodying the invention. As shown, incident laser beam 29 exiting the hologram stack 16 is reflected by a mirror 102 and focused by the objective lens 22 onto disk 24 Disk 24 is rotatably mounted on a spindle 104 and driven in conventional manner by a motor 106. Lens 22 is mounted or a lens holder 108 that is movable toward and away from disk 24 by a focus actuator motor 110, such as a voice coil motor. Lens 22 is also movable radially of disk 24 by a linear motor 112.

The portion of beam 29 reflected from disk 24 as beam 114 and collected and collimated by lens 22 is reflected by mirror 102 to hologram stack 16. Stack 16 operates in the manner above described in connection with FIG. 2 to provide to the laser detector array 12 the data beams 28, 30, focus error servo beams 32, 34 and track error servo beam 36.

Electrical signals generated by these beams 28-36 are directed to a detector circuit 115. Circuit 115 outputs a data signal, a focus error signal (FES) and a tracking error signal (TES). A focus servo circuit 116 is connected to circuit 115 and focus actuator motor 110. A track and seek servo circuit 118 is connected to circuit 115 and the linear motor 112. Laser control circuit 119 provides to laser diode 52 power at intensities preselected for writing and reading as monitored by the power monitor 20 and feedback signal 41 therefrom.

Disk drive controller 120 is connected to and controls motor 106, servo circuits 116, 118, laser control circuit 119, and a magnet control circuit 122. Circuit 122 controls the magnetic field produced by a magnet 124 adjacent the disk surface.

In operation, to write data onto medium 24, magnet 124 and laser diode 52 are turned on. Laser diode 52 produces a write beam 27 of sufficient intensity to heat spots on disk 24 to a temperature above its Curie temperature. Upon cooling below this temperature, the magnetization of the spots will align with the magnetic field produced by magnet 124. Laser diode 52 is controlled to provide a pulsed beam 27 representative of the data to be recorded. The data is thus recorded or disk 24 as spots which have an up or down magnetization.

Figure 5A:
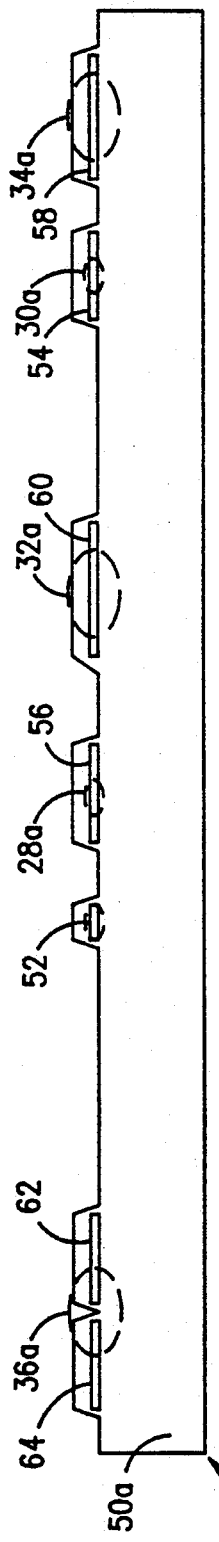
FIGS. 5a, 5b and 5c are side elevational views to enlarged scale of the laser-detector array showing beam spot sizes under various focus conditions.
Figure 5B:
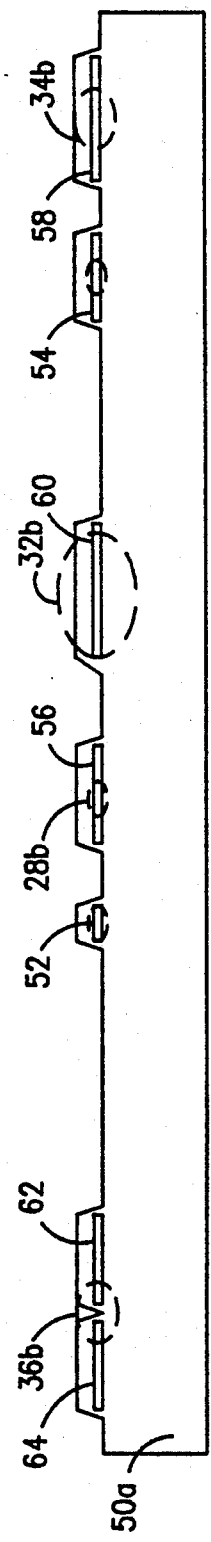
Figure 5C:
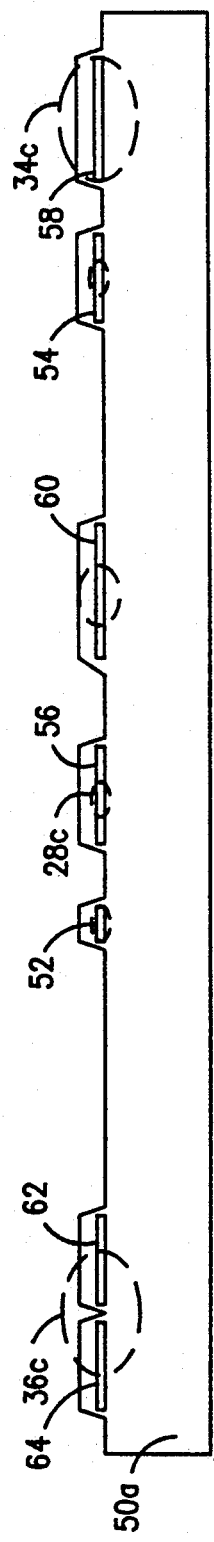

During a write operation, reflected beam 114 is returned to hologram stack 16. Stack 16 divides it into s polarization and p polarization component beams and generates the beams 28,30,32,34, 36 as explained in connection with FIG. 2. FIG. 5a depicts the respective beam spot sizes 30a, 28a, 36a, 32a, 34a on the detectors when disk 24 is in focus of objective lens 22 and incident beam 29 is on track. FIG. 5b shows the respective beam spot sizes 30b, 28b, 36b, 32b and 34b on the detectors when disk 24 is out of focus by being separated less than the focal length from the objective lens 22. FIG. 5c shows the respective beam spot sizes 30c, 28c, 36c, 32c and 34c on the detectors when disk 24 is out of focus by being separated more than the focal length.

Figure 6:
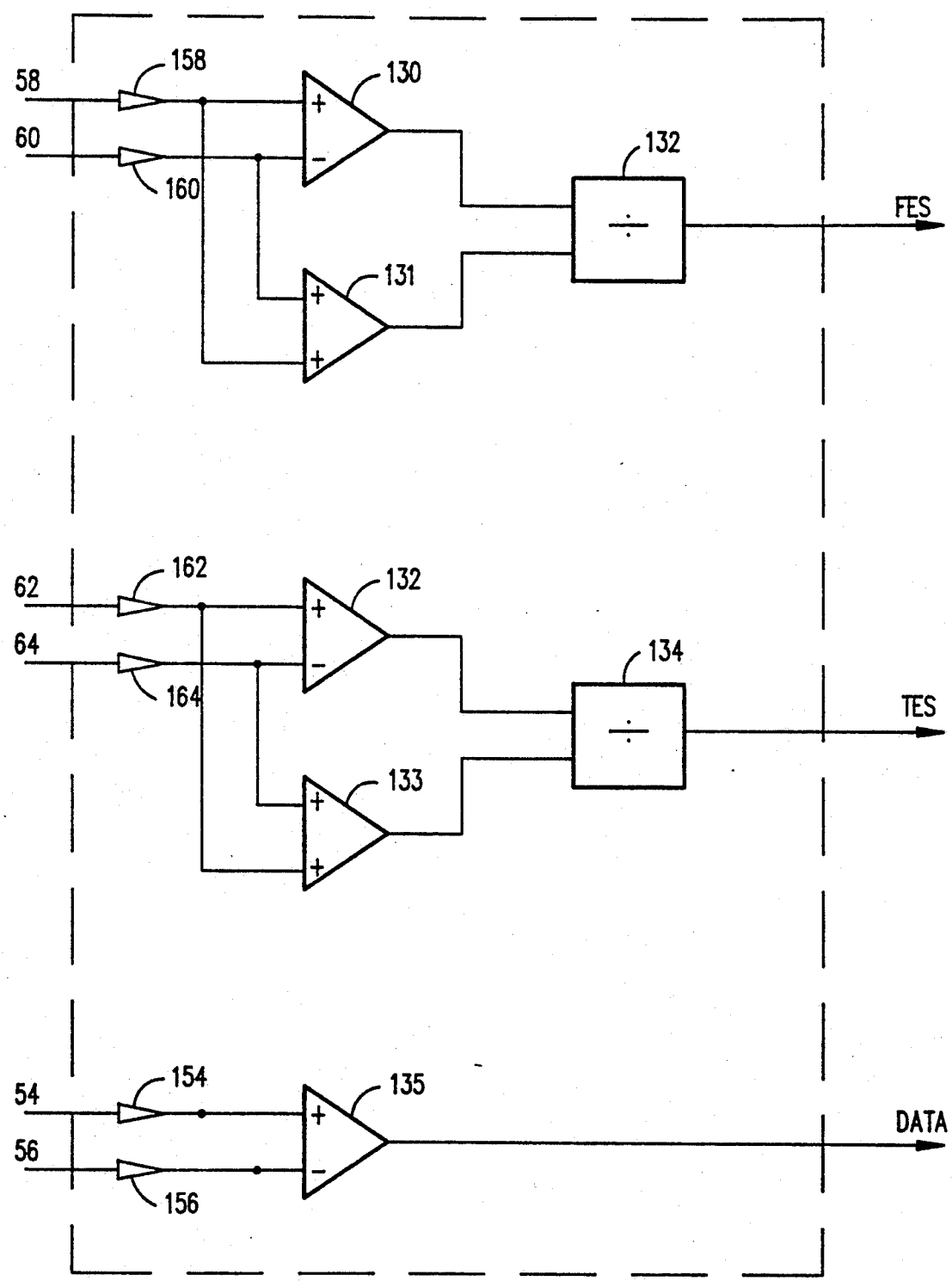
FIG. 6 is a schematic view of a detector circuit for generating data and focus and track error signals.

If beam 29 is slightly out of focus one way or the other, the variation in spot sizes on focus detectors 58 and 60 will create different signal levels due to truncation of the collected intensity perpendicular to the p-n junction plane of the detector array 12. Focus error signals will be generated by detector circuit 115 as depicted in FIG. 6 and now to be explained. The focus servo detector signals 58, 60 are amplified by amplifiers 158 and 160, subtracted from each other by circuit 130 and divided in divider 132 by the sum signal emerging from circuit 131 This yields a normalized focus error signal (FES) to circuit 116 to control motor 110 to move lens 108 until focus is achieved. The focus error detectors 58 and 60 are wide enough to cover the maximum spot sizes of the focus servo beam for a relevant capture region of the focus error servo signal. As a result, tracking errors that produce intensity shifts in the direction of the p-n junction plane will not affect the focus error signal.

If incident beam 29 is focused exactly on a track of disk 24, then beam 36 will be divided equally between the detectors 62,64. If beam 29 is off track, beam 36 will divide unequally. A track error signal (TES) is now created by circuit 115 in a manner similar to the creation of the FES. Signals from track servo detectors 62 and 64 are amplified by amplifiers 162 and 164, and the difference signal created in circuit 132 is divided by the sum signal from circuit 133 in divider 134 to yield a normalized track error signal. This positive or negative tracking error signal to circuit 118 actuates motor 112 to move lens 22 radially until beam 29 is once again on track.

The signals from data detectors 54 and 16 are amplified by amplifiers 154 and 156 and the difference in these signals used by circuit 135 to yield the data signal.

To read data recorded on disk 24, laser diode 52 is energized to produce a read beam 27 of low enough intensity that the disk is not heated above its Curie temperature when the beam is focused by lens 22 onto the disk. The data has already been recorded on the disk as up or down oriented magnetic domains. Light reflected from the disk has its plane of polarization rotated one way or the other depending on the orientation of the magnetic domains. The reflected beam 114 returns and is divided into beams 28,30,32,34,36 at hologram stack 16. The s plarization component data beam 28 and p plarization component data beam 30 are sensed by detectors 56 and 4 of laser-detector array 12. Circuit 114 compares the intensity of the two beams 28,30 and outputs a data signal which is representative of the data recorded on disk 24.

It will now be seen that the MO data storage system 100 embodies a compact polarization sensing optical rear write head 10 which integrates the rear, write, and servo paths and significantly reduces the number of components. Integration of all electro-optical components on the same chip 50 and the use of a micro Faraday rotator 18 in conjunction with polarization and angle sensitive volume holograms H1-H4 provides, as part of the fabrication process, focal self-alignment of all detectors and reduces fabrication, assembly and adjustment costs.

It should be noted that, fi desired, the optical system may be converted to a reflectivity sensing head for phase change recording media if the Faraday rotator 18 and its magnets 19 are replaced with a polarizer (not shown). This will provide a reflectivity sensing head with a high level of electronic integration.

It will now be apparent that the array 12, collimating lens 14, optical element stack 16, prism 17 and Faraday rotator 18 (or polarizer substituted for the rotator) constitute an optical head 10 that is electronically integrated and also highly optically integrated.

While the invention has been shown and described with respect to a preferred embodiment thereof, it will e understood by those skilled in the art that changes in form and detail may be made therein without departing from the scope and teaching of the invention. Accordingly, the embodiment herein disclosed is to be considered merely as illustrative, and the invention is to be limited only as specified in the claims.

We claim:

1. An optical data storage system for writing and reading data on an optical data storage medium, said system comprising:
    an integrated laser-detector array formed on a single substrate and comprising a forward-biased laser diode for producing an incident radiation beam of coherent light and a plurality of reverse-biased diodes searching as light detectors for detecting data and focus error and track error servo signals;
    a collimating lens for collimating the incident radiation beam; and
    a polarization-sensitive optical element comprising a sandwich of four volume holograms for transmitting the collimated incident radiation beam and for receiving p and s polarized return beams reflected from the medium and diffracting and/or transmitting, from said polarized beam to said detectors, multiple beams which are closely spa ed on the substrate.

2. The system of claim 1, wherein said collimating lens provides a curved Petzval surface that permits focal self alignment of al detector diodes with respect to the laser diode.

3. The system of claim 1, including means for monitoring the power of the radiation beam from the laser diode by sensing a satellite beam of said radiation beam which is transmitted and diffracted by said optical element as a radiation-power indicative signal.

4. The system of claim 1, including a Faraday rotator interposed between the polarization-sensitive optical element and medium for providing the linear polarization required for magneto-optical detection and polarization discrimination in the return beam.

5. The system of claim 1, wherein said holograms are planar holograms that generate said multiple beams without segmentation.

6. The system of claim 1, wherein said holograms have no focusing power and segmentation, rendering the insensitive to linear positioning.

7. The system of claim 1, wherein same holograms are dispersion compensated against variations in wavelength of the radiation beam, thereby providing high beam pointing stability.

8. The system of claim 1, wherein said optical element achieves circularization of the incident radiation beam at the air/element interface as it enters said element.

9. The system of claim 8, including a prism for preventing a reversal of the circularization effect as the incident radiation beam exists said element.

10. The system of claim 1, including
    an optical element comprising a plurality of substantially parallel volume holograms for diffracting and/or transmitting to the detector array, p-polarized and s-polarized beams reflected from the medium,
    one portion of said p-polarized beam being diffracted by a first one of the holograms, transmitted through a second and a third one of the holograms, and diffracted by a fourth one of the holograms, to supply a p-polarized data signal (30) to the detector array, and another portion of said p-polarized beam being transmitted through said fist hologram, said other portion having one part that is diffracted successively by said second and third holograms and transmitted by said fourth hologram as one focus error signal (32) to the detector array, and another part that is transmitted successively by said second, third and fourth holograms as another focus error signal (34) to the detector array; and
    one portion of said s-polarized beam being diffracted by said first hologram, transmitted successively by said second and third holograms, and diffracted by said fourth hologram as an s-polarized data signal (28) t the detector array, and another portion of said s-polarized beam being transmitted by said first and second holograms and diffracted successively by said third and fourth holograms as a track error signal (36) to the detector array.

11. The system of claim 10, including a laser power monitor for sensing laser power from a satellite beam of the laser diode-generated incident radiation beam that is transmitted without diffraction by said fourth, third and second holograms and diffracted by said first hologram as a laser power indicating signal; and
    means responsive to said power indicating signal to control the power to the laser diode.

12. An optical data storage system for writing and reading data on an optical storage medium comprising:
    an optical element comprising first, second, third and fourth substantially parallel volume holograms for diffracting and/or transmitting p-polarized and s-polarized radiation beams reflected from the medium, characterized in that:
    one portion of said p-polarized beam is diffracted by the first hologram, transmitted through the second and third holograms, and diffracted by the fourth hologram to generate a p-polarized data signal (30), and another portion of said p-polarized beam being transmitted through said first hologram, said other portion having one part that is diffracted successively by said second and third holograms and transmitted by said fourth hologram as one focus error signal (32), and another part that is transmitted successively by said second, third and fourth holograms as another focus error signal (34); and
    one portion of said s-polarized beam is diffracted by said first hologram, transmitted successively by said second and third holograms, and diffracted by said fourth hologram as an s-polarized data signal (28), and another portion of said s-polarized beam is transmitted by said first and second holograms and diffracted successively by said third and fourth holograms as a track error signal (36).

13. An optical data storage system comprising:
    an optical data storage medium;
    an integrated laser-detector array formed on a single substrate and comprising a forward-biased laser diode for producing an incident beam of coherent light and a plurality of reverse-biased diodes serving as light detectors for detecting data and focus error and track error servo signals;
    a collimating lens for collimating the incident beam;
    an optical element comprising a sandwich of four volume holograms for transmitting the collimated incident beam to the medium and for transmitting and/or diffracting p and s polarized return beams reflected from the medium with multiple beams, which are transmitted to said detectors and focuser on a curved Petzval surface provided by said collimating lens that focally aligns the detector diodes with respect to the laser diode.

14. The system of claim 13, wherein the distances between the respective diodes on the substrate are determined by the focal length of said collimating lens and relative angularities of said multiple beams.

15. The system of claim 19, wherein the diodes or focus error detection are each wide enough to cover a maximum predetermined permissible spot size of the multiple beams to the focus error diodes, for thereby rendering focus error servo signals insensitive to intensity shifts produced by an off track position of the return beam.

16. A method of integrating read, write and servo paths in an optical data storage system, comprising the steps of:
providing a single planar chip having a forward-biased laser diode and a plurality of reverse-biased diodes serving as data and servo detectors thereon;
aligning a collimating lens to a coherent radiation beam transmitted from the laser diode to an optical storage medium;
aligning a volume hologram optical element with the plane of the chip to provide, from a return beam reflected from the medium, multiple beams of preselected polarization and pointing angles for transmission is the collimating lens to respective ones of said detector diodes;
using a parabolic Petzval surface of the collimating lens, selecting for the multiple beams pointing angles that enable said diodes to be closely spaced on a face of the chip; and
focally aligning the detector diodes with the laser diode.

* * * * *

UNITED STATES PATENT AND TRADEMARK OFFICE
CERTIFICATE OF CORRECTION

PATENT NO. : 5,212,572

DATED : May 18, 1993

INVENTOR(S) : Matthias C. Krantz, LeRoy D. Dickson

It is certified that error appears in the above-identified patent and that said Letters Patent is hereby corrected as shown below:

On the title page:
<u>IN THE ABSTRACT</u>

At beginning of fifth line of the Abstract, "an," should be --and,--.

Column 9, line 29, "spa ed" should be --spaced--.

Column 9, line 33, "al" should be --all--.

Column 10, line 17, "t" should be --to--.

Column 9, line 50, "the" should be --them--.

Column 12, line 14, "is" should be --via--.

Signed and Sealed this

First Day of February, 1994

BRUCE LEHMAN

*Attest:*

*Attesting Officer*           *Commissioner of Patents and Trademarks*